(12) United States Patent
Metz et al.

(10) Patent No.: US 11,229,314 B2
(45) Date of Patent: Jan. 25, 2022

(54) CLAMSHELL INDUCTION COOKING SYSTEM

(71) Applicant: CookTek Induction Systems, LLC, Carrollton, TX (US)

(72) Inventors: Reinhard Metz, Wheaton, IL (US); James K. Pool, Frisco, TX (US); Warren S. Graber, Hoffman Estates, IL (US)

(73) Assignee: COOK TEK INDUCTION SYSTEMS, LLC, Carrollton, TX (US)

( * ) Notice: Subject to any disclaimer, the term of this patent is extended or adjusted under 35 U.S.C. 154(b) by 782 days.

(21) Appl. No.: 15/631,311

(22) Filed: Jun. 23, 2017

(65) Prior Publication Data

US 2017/0367529 A1 Dec. 28, 2017

Related U.S. Application Data

(60) Provisional application No. 62/355,736, filed on Jun. 28, 2016.

(51) Int. Cl.
*A47J 36/02* (2006.01)
*H05B 6/12* (2006.01)
(Continued)

(52) U.S. Cl.
CPC .............. *A47J 36/02* (2013.01); *A47J 37/04* (2013.01); *A47J 37/0611* (2013.01);
(Continued)

(58) Field of Classification Search
CPC ......... A47J 36/02; A47J 37/04; A47J 37/0676
(Continued)

(56) References Cited

U.S. PATENT DOCUMENTS

| | | | | |
|---|---|---|---|---|
| 3,781,503 A | * | 12/1973 | Hamden, Jr. | ....... A47J 36/2483 |
| | | | | 219/622 |
| 8,573,117 B2 | * | 11/2013 | Shealy | ................ A47J 37/0623 |
| | | | | 219/620 |
| 2010/0116820 A1 | | 5/2010 | Pan et al. | |

FOREIGN PATENT DOCUMENTS

| | | |
|---|---|---|
| CA | 2638036 A1 | 7/2007 |
| CN | 201079300 Y | 7/2008 |
| | (Continued) | |

OTHER PUBLICATIONS

Machine Translation for FR3008878; translated Nov. 2019 (Year: 2019).*

(Continued)

*Primary Examiner* — Tu B Hoang
*Assistant Examiner* — Thomas J Ward
(74) *Attorney, Agent, or Firm* — Michael Best & Friedrich LLP

(57) ABSTRACT

An induction cooking system including a first shell including a first housing, a first plate coupled to the first housing, and a first induction coil within the first housing. The induction cooking system also includes a second shell coupled to the first shell, the second shell including a second housing, a second plate coupled to the second housing, and a second induction coil within the second housing. The induction cooking system further includes a first temperature sensor for sensing a first plate temperature, a second temperature sensor for sensing a second plate temperature, and a controller. The controller is configured to receive the first plate temperature, receive the second plate temperature, adjust a first current supply to the first induction coil based on the first plate temperature, and adjust a second current supply to the second induction coil based on the second plate temperature.

24 Claims, 12 Drawing Sheets

(51) Int. Cl.
*A47J 37/04* (2006.01)
*A47J 37/06* (2006.01)
*A47J 37/00* (2006.01)

(52) U.S. Cl.
CPC ............ *A47J 37/0676* (2013.01); *H05B 6/12* (2013.01); *H05B 6/1209* (2013.01); *A47J 37/00* (2013.01)

(58) Field of Classification Search
USPC ................................ 219/621, 660, 661, 670
See application file for complete search history.

(56) References Cited

FOREIGN PATENT DOCUMENTS

| | | | |
|---|---|---|---|
| CN | 201360949 Y | 12/2009 | |
| CN | 202355242 U | 8/2012 | |
| CN | 102813466 A | 12/2012 | |
| CN | 202723633 U | 2/2013 | |
| CN | 202698884 U | 1/2021 | |
| EP | 2683216 A1 | 1/2014 | |
| FR | 3008878 | * 1/2015 | ............... H05B 6/12 |
| FR | 3008878 A1 | 1/2015 | |
| JP | S63164196 U | 10/1988 | |
| JP | H09102386 A | 4/1997 | |
| TW | M328258 U | 3/2008 | |

OTHER PUBLICATIONS

European Extended Search Report for Application No. 17177784.0 dated Nov. 15, 2017 (11 pages).

Office Action issued from the Chinese Patent Office for related Application No. 201710507587.9 dated Aug. 27, 2021 (24 Pages including English Translation).

* cited by examiner

CLAMSHELL INDUCTION COOKING SYSTEM

CROSS-REFERENCE TO RELATED APPLICATIONS

This application claims the benefit of, prior-filed U.S. Provisional Patent Application No. 62/355,736, filed Jun. 28, 2016, the entire contents of which are incorporated by reference.

BACKGROUND

The present disclosure relates to induction cooking systems, such as but not limited to, griddle and grill cooking systems, in particular those griddle and grill cooking systems having a clamshell design.

Typically, griddle and grill cooking systems incorporate resistive backside heat technology or embedded heater technology to heat upper and lower heating plates. Such systems are inefficient, require a substantial amount of time to recover heat following a cooking cycle, and may result in hot spots in the upper and lower heating elements.

SUMMARY

In one embodiment, an induction cooking system includes a first shell and a second shell. The first shell includes a first housing, a first plate, a first induction coil, and a second induction coil. The first plate is coupled to the first housing. The first induction coil is disposed within the first housing. The first induction coil has an axis extending from a first end of the first induction coil to a second end of the first induction coil. The second end of the first induction coil is opposite from the first end of the first induction coil. A portion of the first induction coil defines a peripheral edge extending from the first end of the first induction coil to the second end of the first induction coil. A first distance between the axis of the first induction coil and the peripheral edge of the first induction coil decreases and then increases from the first end of the first induction coil to the second end of the first induction coil. The second induction coil is disposed within the first housing. The second induction coil has an axis extending from a first end of the second induction coil to a second end of the second induction coil. The second end of the second induction coil is opposite from the first end of the second induction coil. A portion of the second induction coil defines a peripheral edge extending from the first end of the second induction coil to the second end of the second induction coil. A second distance between the axis of the second induction coil and the peripheral edge of the second induction coil decreases and then increases from the first end of the second induction coil to the second end of the second induction coil. The second shell is coupled to the first shell. The second shell includes a second housing and a second plate. The second plate is coupled to the second housing.

In another embodiment, an induction cooking system includes an induction coil, a first shell, a second shell, a first temperature sensor, a second temperature sensor and an electric controller. The induction coil includes a first coil-half and a second coil-half. The first shell includes a first housing, a first plate, and the first coil-half within the first housing. The first plate is coupled to the first housing. The first coil-half is located adjacent to the first plate. The second shell is coupled to the first shell. The second shell includes a second housing, a second plate, and the second coil-half within the second housing. The second plate is coupled to the second housing. The second coil-half is located adjacent to the second plate. The first temperature sensor senses a first plate temperature. The second temperature sensor senses a second plate temperature. The electronic controller is configured to receive the first plate temperature and the second plate temperature. The electronic controller is also configured to adjust a current supply to the induction coil based on at least one selected from a group consisting of the first plate temperature and the second plate temperature.

In another embodiment, an induction cooking system includes a first shell and a second shell. The first shell includes a first housing, a first plate, a first induction coil, and a second induction coil. The first plate is coupled to the first housing. The first induction coil is disposed within the first housing. The first induction coil has a first peripheral edge and a second peripheral edge both extending from a first end of the first induction coil to a second end of the first induction coil. The second end of the first induction coil is opposite from the first end of the first induction coil. A first distance between the first peripheral edge of the first induction coil and the second peripheral edge of the first induction coil decreases and then increases from the first end of the first induction coil to the second end of the first induction coil. The second induction coil is disposed within the first housing. The second induction coil has a first peripheral edge and a second peripheral edge both extending from a first end of the second induction coil to a second end of the second induction coil. The second end of the second induction coil is opposite from the first end of the second induction coil. A second distance between the first peripheral edge of the second induction coil and the second peripheral edge of the second induction coil decreases and then increases from the first end of the second induction coil to the second end of the second induction coil. The second shell is coupled to the first shell. The second shell includes a second housing and a second plate. The second plate is coupled to the second housing.

In another embodiment, a method of operating an induction cooking system, in which the induction cooking system includes a first shell and a second shell. The first shell has a first housing, a first plate, and a first induction coil within the first housing. The first plate is coupled to the first housing. The first induction coil is located adjacent to the first plate. The second shell is coupled to the first shell. The second shell has a second housing, a second plate, and a second induction coil within the second housing. The second plate is coupled to the second housing. The second induction coil is located adjacent to the second plate. The method includes the steps of receiving a first plate temperature and receiving a second plate temperature. The method also includes the steps of adjusting a first current supply to the first induction coil based on the first plate temperature and adjusting a second current supply to the second induction coil based on the second plate temperature.

Other aspects of the disclosure will become apparent by consideration of the detailed description and accompanying drawings.

Figure 1:
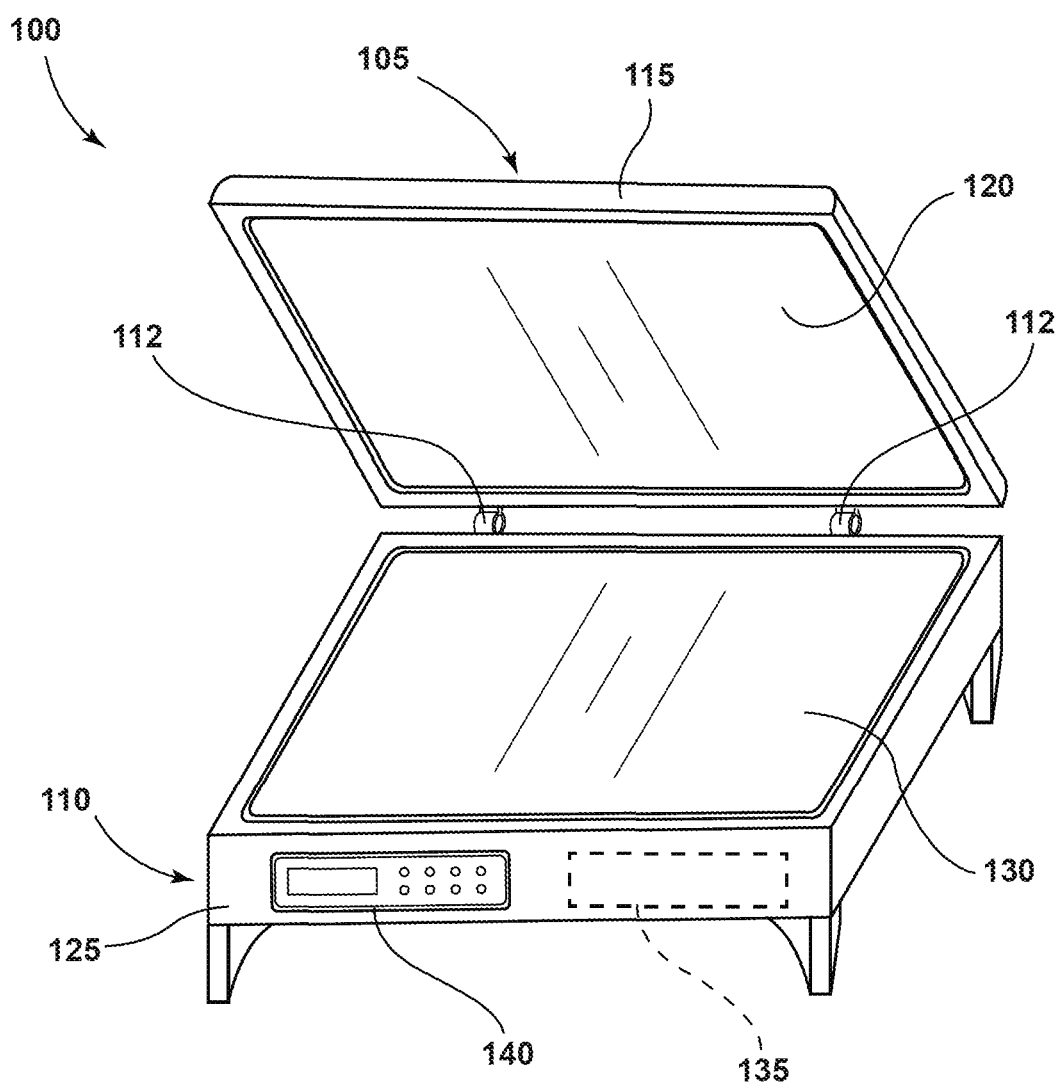
FIG. 1 is a perspective view of an induction cooking system shown in an open position and according to one embodiment of the invention.

The components in the drawings are not necessarily to scale, emphasis instead being placed upon clearly illustrating the principles of the disclosure.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

According to various embodiments, a clamshell-type induction cooking system includes two opposing heating plates brought together and used for grilling foods such as sandwiches, for example panini sandwiches, as well as baking foods such as waffles, for example Belgian waffles. In contrast to systems that use other heating technologies such as resistive heating, the inductive cooking system uses inductive heating to heat the cooking surfaces, providing higher efficiency as well as faster reheating/recovery times and ultimately leading to higher throughput. In addition, the use of inductive heating, which does not require a hardwired connection between the heating coils and the heating plates, facilitates removal of the heating plates for cleaning and replacement.

Figure 2:
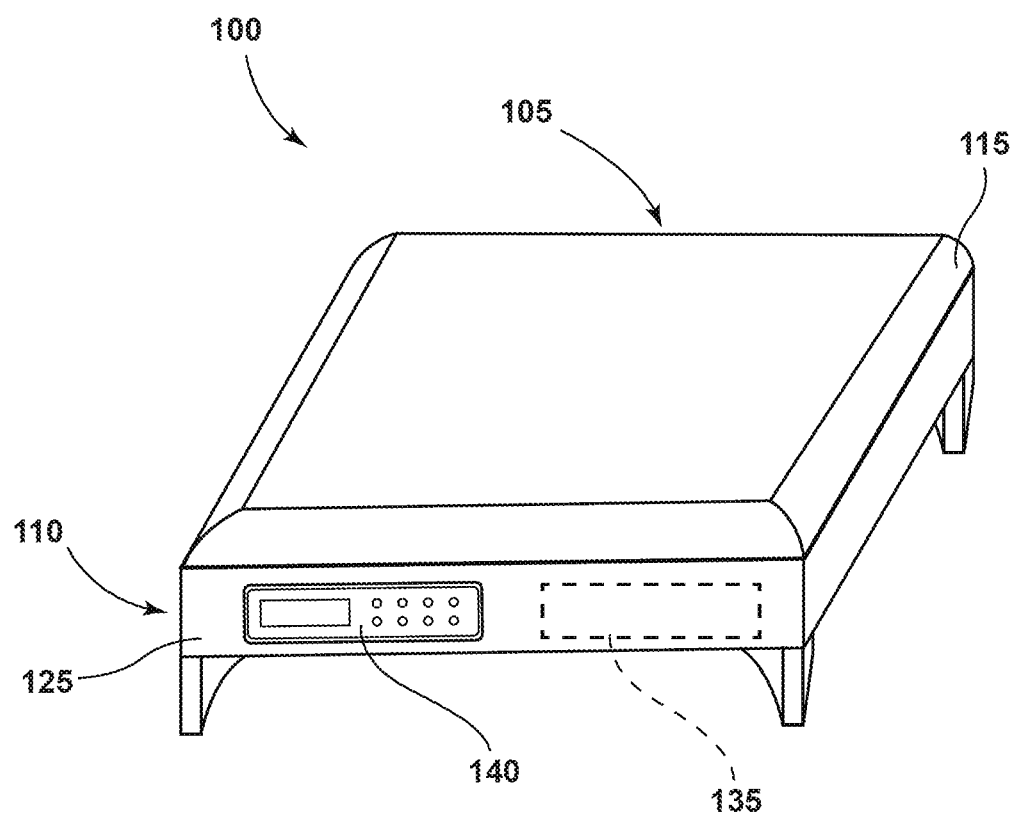
FIG. 2 is a perspective view of the induction cooking system of FIG. 1 shown in a closed position.

FIGS. 1 and 2 are perspective views of an induction cooking system 100 shown in open and closed positions, respectively. The induction cooking system 100 includes an upper shell 105 and a lower shell 110. The upper shell 105 is pivotably coupled to the lower shell 110, and preferably pivotably coupled via one or more hinges 112. The upper shell 105 has an upper housing 115 and an upper plate 120. The lower shell 110 has a lower housing 125 and a lower plate 130. The upper and lower plates 120, 130 may be releasably coupled to the induction cooking system 100, for example, to facilitate cleaning and to permit replacement as needed. The induction cooking system 100 also includes an electronic controller 135. In the illustrated embodiment, the electronic controller 135 is contained within the lower housing 125, however, in other embodiments the electronic controller 135 may be contained within the upper housing 115. In some embodiments the induction cooking system 100 may further include a user interface 140.

Figure 3:
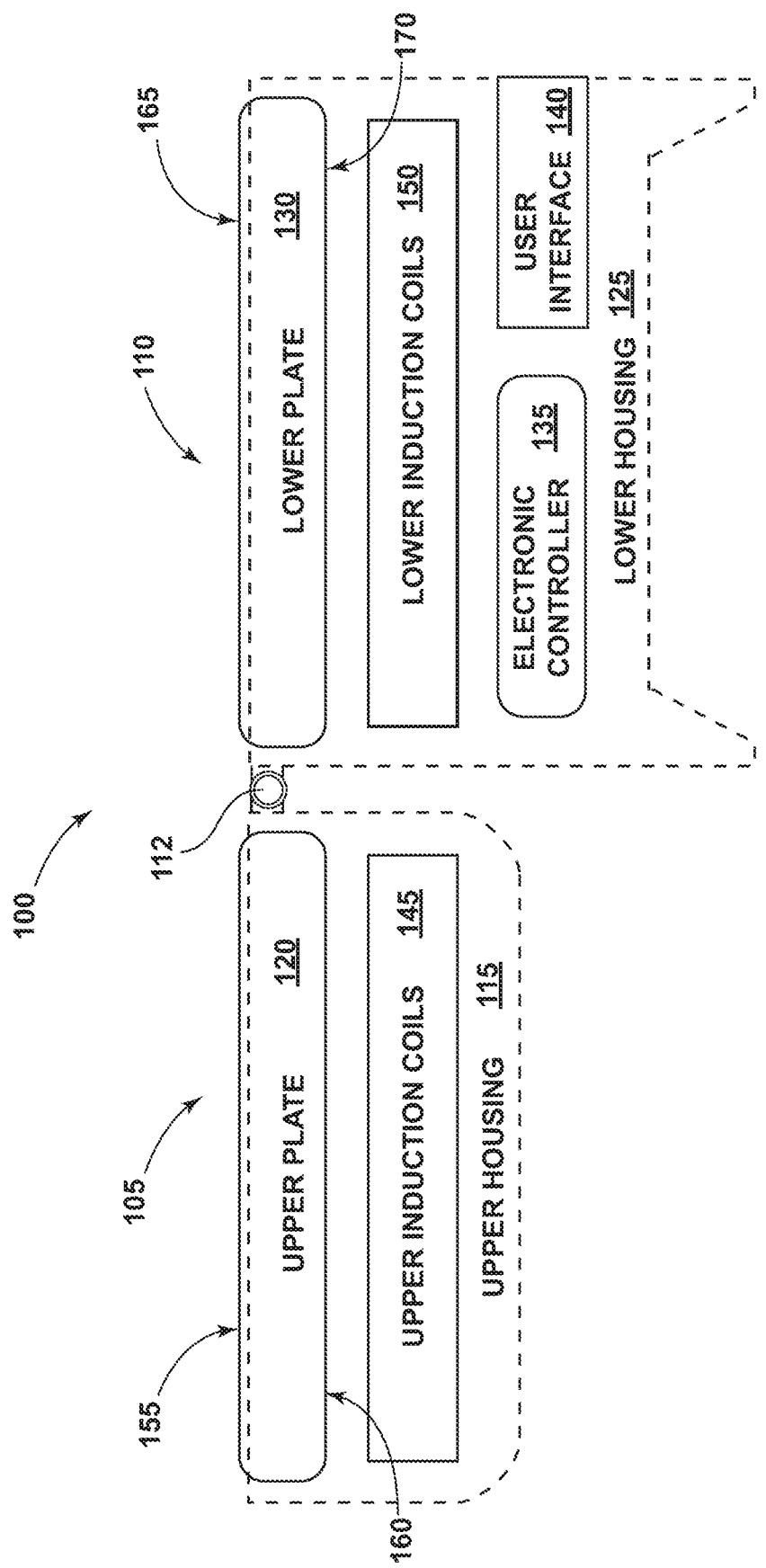
FIG. 3 is a schematic side view of the induction cooking system of FIG. 1.

Referring to FIG. 3, the induction cooking system 100 includes upper induction coils 145 and lower induction coils 150. The upper plate 120 includes a first side 155 and an opposing second side 160. The lower plate 130 includes a first side 165 and an opposing second side 170. The upper and lower induction coils 145, 150 are positioned adjacent to the upper and lower plates 120, 130, respectively, and specifically the upper induction coils 145 are positioned facing the second side 160 of the upper plate 120 and the lower induction coils 150 are positioned facing the second side 170 of the lower plate 130. No wires or other electrical connections are required between the induction coils and the plates.

In some embodiments, the upper and lower plates 120, 130 are made of aluminum. As aluminum plates are generally difficult to induce heat in, in such embodiments the upper and lower plates 120, 130, magnetic steel (e.g., low carbon steel) may be deposited (e.g., plasma-sprayed) on the second sides 160, 170. The magnetic steel may be coated with a corrosion protective layer. In other embodiments, the upper and lower plates 120, 130 are made of a ferromagnetic material (e.g., iron). In some embodiments, the upper and lower plates 120, 130 are relatively thin (e.g., having a thickness between 6 and 10 millimeters) to promote faster initial heating as well as faster reheating following a cooking cycle. In some embodiments, the upper plate 120 is removable from the upper housing 115 and the lower plate 130 is removable from the lower housing 125.

Figure 4:
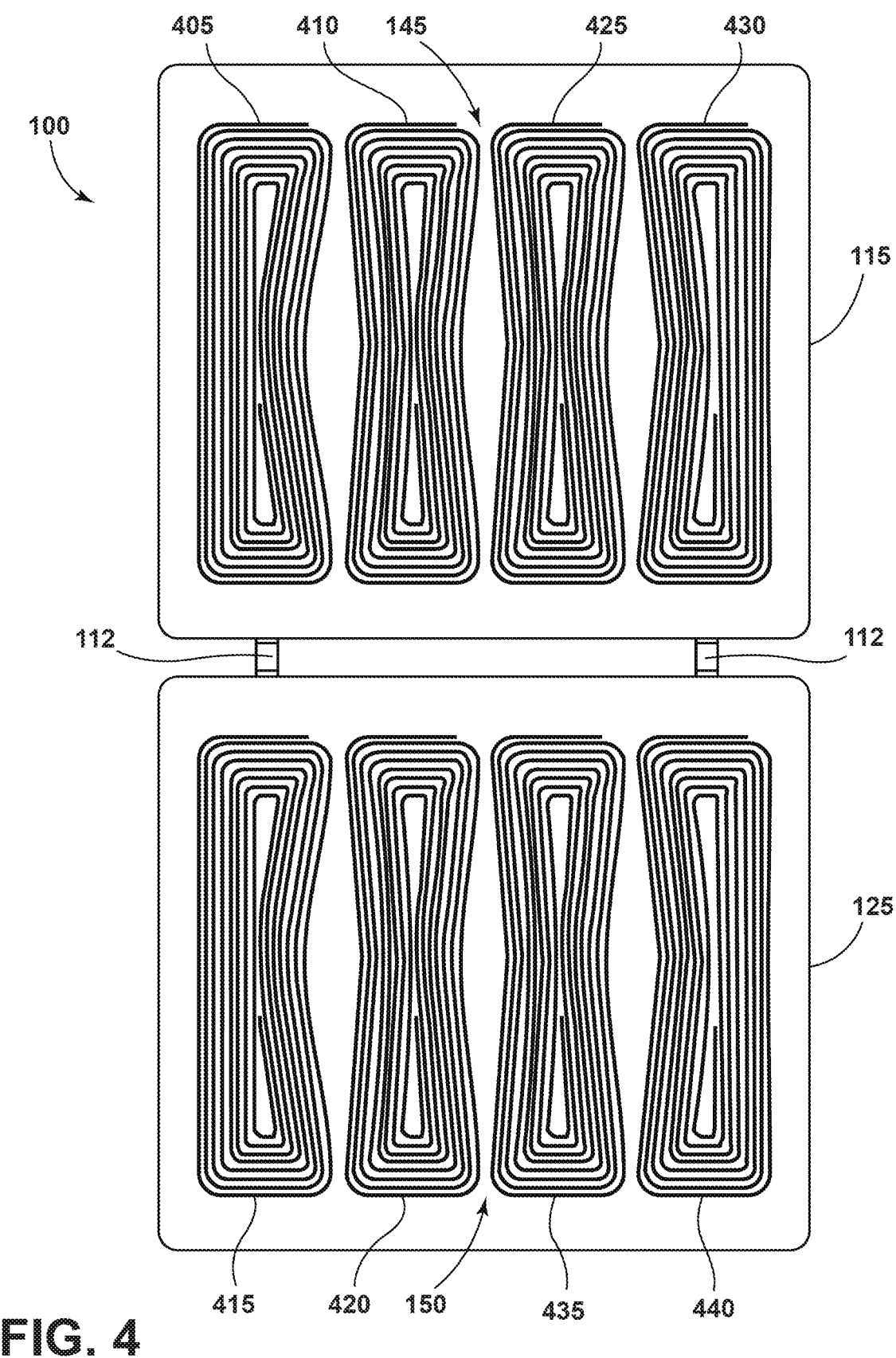
FIG. 4 is a top view of the induction cooking system of FIG. 1.

FIG. 4 is a top view of the induction cooking system 100 shown in an open position. In the illustrated view, the upper and lower plates 120, 130 have been removed for illustrative purposes. The upper induction coils 145 include a first induction coil 405 and a second induction coil 410. The lower induction coils 150 include a third induction coil 415 and a fourth induction coil 420. The upper induction coils 145 also include a fifth induction coil 425 and a sixth induction coil 430. The lower induction coils 150 also include a seventh induction coil 435 and an eighth induction coil 440.

Figure 5:
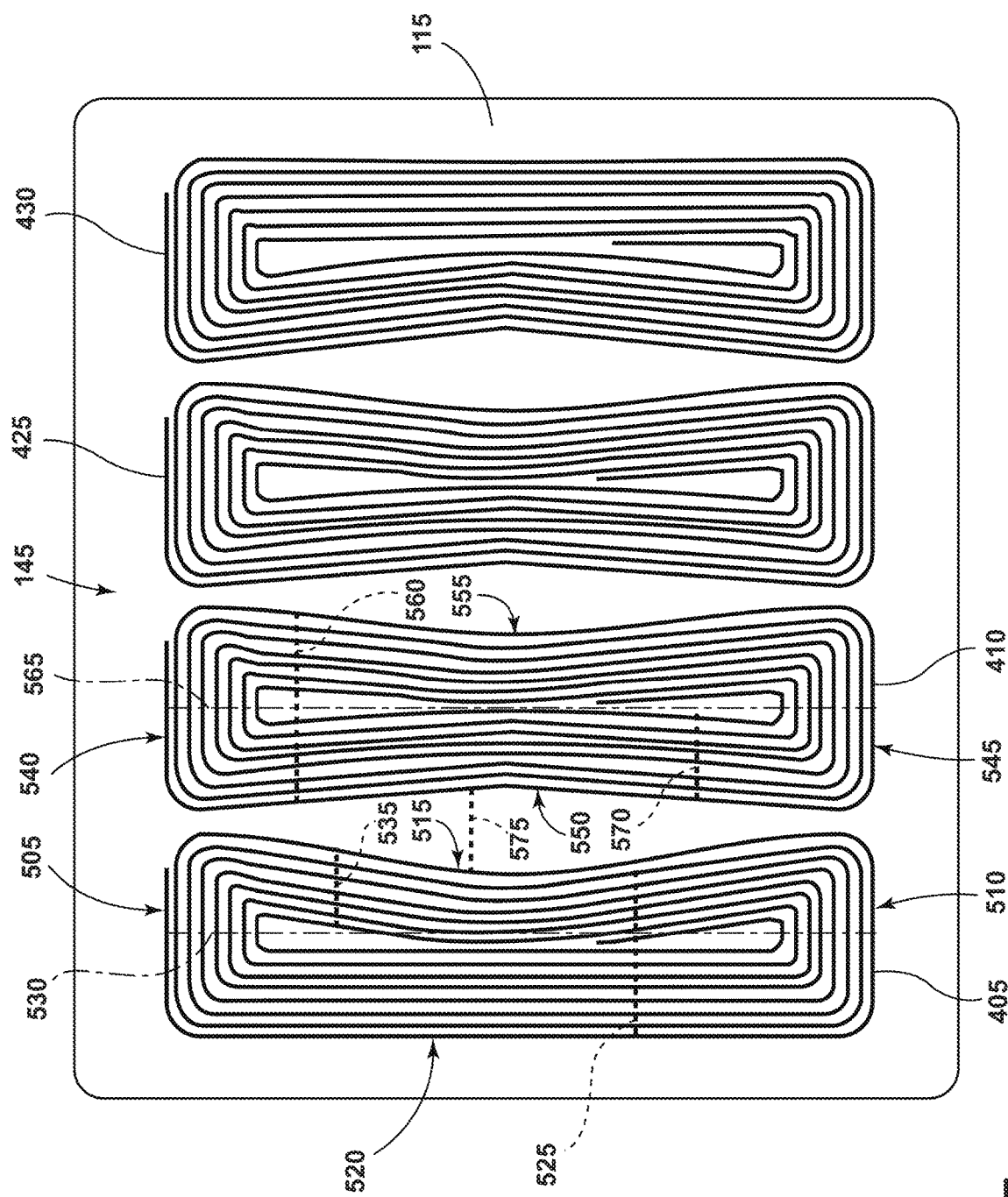
FIG. 5 is a top view of a housing and induction coils of a portion of the induction cooking system of FIG. 4.

FIG. 5 is an enlarged view of the upper housing 115 and the upper induction coils 145 in FIG. 4. The first induction coil 405 includes, among other things, a first end 505, an opposing second end 510, a first peripheral edge 515, and an opposing second peripheral edge 520. The first and second peripheral edges 515, 520 are outer edges that extend along portions of the outermost wrapping of the first induction coil 405. A first distance 525 is defined between the first and second peripheral edges 515, 520 of the first induction coil 405 and varies with the contours or paths of the peripheral edges. In some embodiments, for example, the first distance 525 decreases and then increases from one of the ends 505, 510 to the other of the ends 505, 510. An axis 530 extends from the first end 505 to the second end 510 of the first induction coil 405. A second distance 535 is defined between the first peripheral edge 515 and the axis 530 of the first induction coil 405 and varies with the contour or path of the first peripheral edge 515 relative to the axis 530. In some embodiments, for example, the second distance 535 decreases and then increases from one of the ends 505, 510 to the other of the ends 505, 510.

The second induction coil 410 includes, among other things, a first end 540, an opposing second end 545, a first peripheral edge 550, and an opposing second peripheral edge 555. The first and second peripheral edges 550, 555 are outer edges that extend along portions of the outermost wrapping of the second induction coil 410. A third distance 560 is defined between the first and second peripheral edges 550, 555 of the second induction coil 410 and varies with the contours or paths of the peripheral edges. In some embodiments, for example, the third distance 560 decreases and then increases from one of the ends 540, 545 to the other of the ends 540, 545. An axis 565 extends from the first end 540 to the second end 545 of the second induction coil 410. A fourth distance 570 is defined between the first peripheral edge 550 and the axis 565 of the second induction coil 410 and varies with the contour or path of the first peripheral edge 550 relative to the axis 565. In some embodiments, for example, the fourth distance 570 decreases and then increases from one of the ends 540, 545 to the other of the ends 540, 545.

In some embodiments, the axis 530 of the first induction coil 405 and the axis 565 of the second induction coil 410 lay in a common first plane. In some embodiments, the common first plane is parallel to the second side 160 of the upper plate 120.

In the embodiment illustrated in FIG. 5, the first and second induction coils 405, 410 are positioned next to each other such that the first peripheral edge 515 of the first induction coil 405 is adjacent to the first peripheral edge 550 of the second induction coil 410. In such embodiments, a fifth distance 575 defined between the first peripheral edge 515 of the first induction coil 405 and the first peripheral edge 550 of the second induction coil 410 increases and then decreases from one of the ends 505, 510 to the other of the ends 505, 510 (and from one of the ends 540, 545 to the other of the ends 540, 545).

Figure 6:
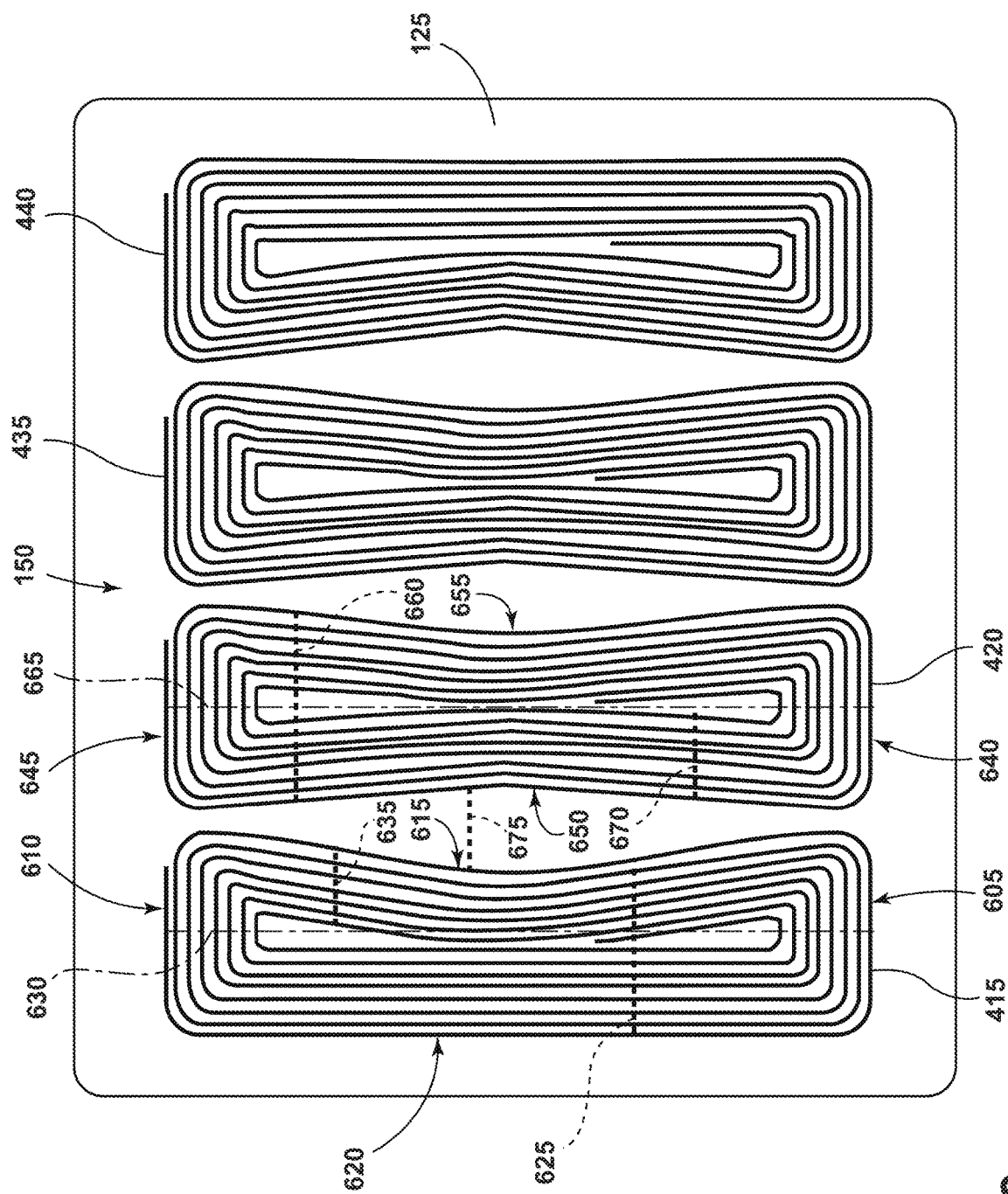
FIG. 6 is a top view of a housing and induction coils of another portion of the induction cooking system of FIG. 4.

FIG. 6 is an enlarged view of the lower housing 125 and the lower induction coils 150 in FIG. 4. The third induction coil 415 includes, among other things, a first end 605, an opposing second end 610, a first peripheral edge 615, and an opposing second peripheral edge 620. The first and second peripheral edges 615, 620 are outer edges that extend along portions of the outermost wrapping of the third induction coil 415. A first distance 625 is defined between the first and second peripheral edges 615, 620 of the third induction coil 415 and varies with the contours or paths of the peripheral edges. In some embodiments, for example, the first distance 625 decreases and then increases from one of the ends 605, 610 to the other of the ends 605, 610. An axis 630 extends from the first end 605 to the second end 610 of the third induction coil 415. A second distance 635 is defined between the first peripheral edge 615 and the axis 630 of the third induction coil 415 and varies with the contour or path of the first peripheral edge 615 relative to the axis 630. In some embodiments, for example, the second distance 635 decreases and then increases from one of the ends 605, 610 to the other of the ends 605, 610.

The fourth induction coil 420 includes, among other things, a first end 640, an opposing second end 645, a first peripheral edge 650, and an opposing second peripheral edge 655. The first and second peripheral edges 650, 655 are outer edges that extend along portions of the outermost wrapping of the fourth induction coil 420. A third distance 660 is defined between the first and second peripheral edges 650, 655 of the fourth induction coil 420 and varies with the contours or paths of the peripheral edges. In some embodiments, for example, the third distance 660 decreases and then increases from one of the ends 640, 645 to the other of the ends 640, 645. An axis 665 extends from the first end 640 to the second end 645 of the fourth induction coil 420. A fourth distance 670 is defined between the first peripheral edge 650 and the axis 665 of the fourth induction coil 420 and varies with the contour or path of the first peripheral edge 650 relative to the axis 665. In some embodiments, for example, the fourth distance 670 decreases and then increases from one of the ends 640, 645 to the other of the ends 640, 645.

In some embodiments, the axis 630 of the third induction coil 415 and the axis 665 of the fourth induction coil 420 lay in a common second plane. In some embodiments, the common second plane is parallel to the second side 170 of the lower plate 130.

In the embodiment illustrated in FIG. 6, the third and fourth induction coils 415, 420 are positioned next to each other such that the first peripheral edge 615 of the third induction coil 415 is adjacent to the first peripheral edge 650 of the fourth induction coil 420. In such embodiments, a fifth distance 675 defined between the first peripheral edge 615 of the third induction coil 415 and the first peripheral edge 650 of the fourth induction coil 420 increases and then decreases from one of the ends 605, 610 to the other of the ends 605, 610 (and from one of the ends 640, 645 to the other of the ends 640, 645).

In some embodiments, the upper and lower induction coils 145, 150 may be configured as parallel-resonant, zero-voltage switched, center-tapped coils. In such embodiments, the upper induction coils 145 and lower induction coils 150 form a single induction coil, which is split in two-halves (e.g., an upper coil-half and a lower coil-half).

Figure 7:
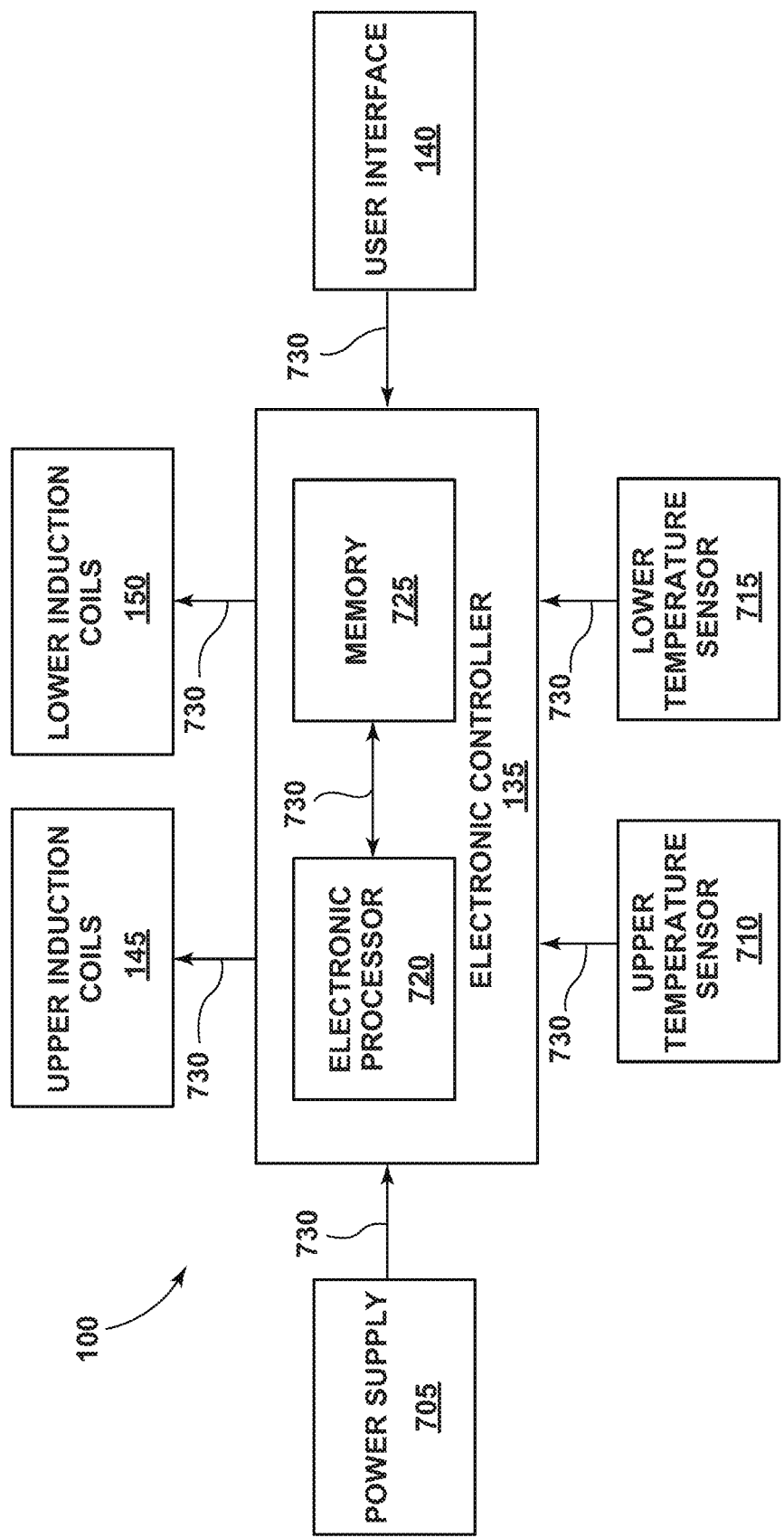
FIG. 7 is a block diagram of certain components of an induction cooking system, according to another embodiment of the invention.

FIG. 7 is a block diagram of an embodiment of the induction cooking system 100 including the electronic controller 135. The electronic controller 135 may be communicatively (for example, electrically) coupled to, among other things, the user interface 140, the upper induction coils 145, the lower induction coils 150, a power supply 705, an upper temperature sensor 710, and a lower temperature sensor 715. The electronic controller 135 includes combinations of hardware and software that are operable to control the induction cooking system 100.

In some embodiments, the electronic controller 135 includes a plurality of electrical and electronic components that provide power, operational control, and protection to the components and modules within the electronic controller 135 and/or the induction cooking system 100. For example, the electronic controller 135 includes an electronic processor 720 (e.g., a microprocessor, a microcontroller, or another suitable programmable device), and a memory 725. The electronic processor 720 may be implemented using known computer architecture, such as a modified Harvard architecture, a von Neumann architecture, or other suitable architecture. The electronic processor 720 and the memory 725, as well as the various modules connected to the electronic controller 135, are connected by one or more control and/or data buses 730 shown generally in FIG. 7 for illustrative purposes. In some embodiments, the electronic controller 135 is implemented partially or entirely on a semiconductor (for example, a field-programmable gate array [FPGA] semiconductor) chip, such as a chip developed through a register transfer level (RTL) design process.

The user interface 140 may include a combination of digital and analog input and output devices required to achieve a desired level of control and monitoring for the induction cooking system 100. In some embodiments, the user interface 140 includes a display and a plurality of user-input mechanisms. The display may use any suitable technology including, but not limited to, a liquid crystal display (LCD), a light-emitting diode (LED) display, an organic LED (OLED) display, an electroluminescent display (ELD), a surface-conduction electron-emitter display (SED), a field emission display (FED), and a thin-film transistor (TFT) LCD. The plurality of user-input mechanisms may be, but is not limited to, a plurality of knobs, dials, switches, and buttons. In other embodiments, the user interface 140 may include a touch screen, such as but not limited to, a capacitive touch screen. In some embodiments, the user interface 140 further includes a speaker or other sound-generating device to provide auditory indications of the status or condition of the induction cooking system 100.

The power supply 705 is configured to provide power to the upper and lower induction coils 145, 150 as well as to the electronic controller 135, supplying a nominal AC or DC voltage to the electronic controller 135 or other components or modules of the induction cooking system 100 (for example, the upper and lower induction coils 145, 150 and the upper and lower temperature sensors 710, 715, etc.). The power supply 705 is powered by, for example, a power source having nominal line voltages between 100V and 240V AC and frequencies of approximately 50-60 Hz. The power supply 705 is also configured to supply lower voltages to operate circuits and components within the electronic controller 135 or the induction cooking system 100.

Figure 8:
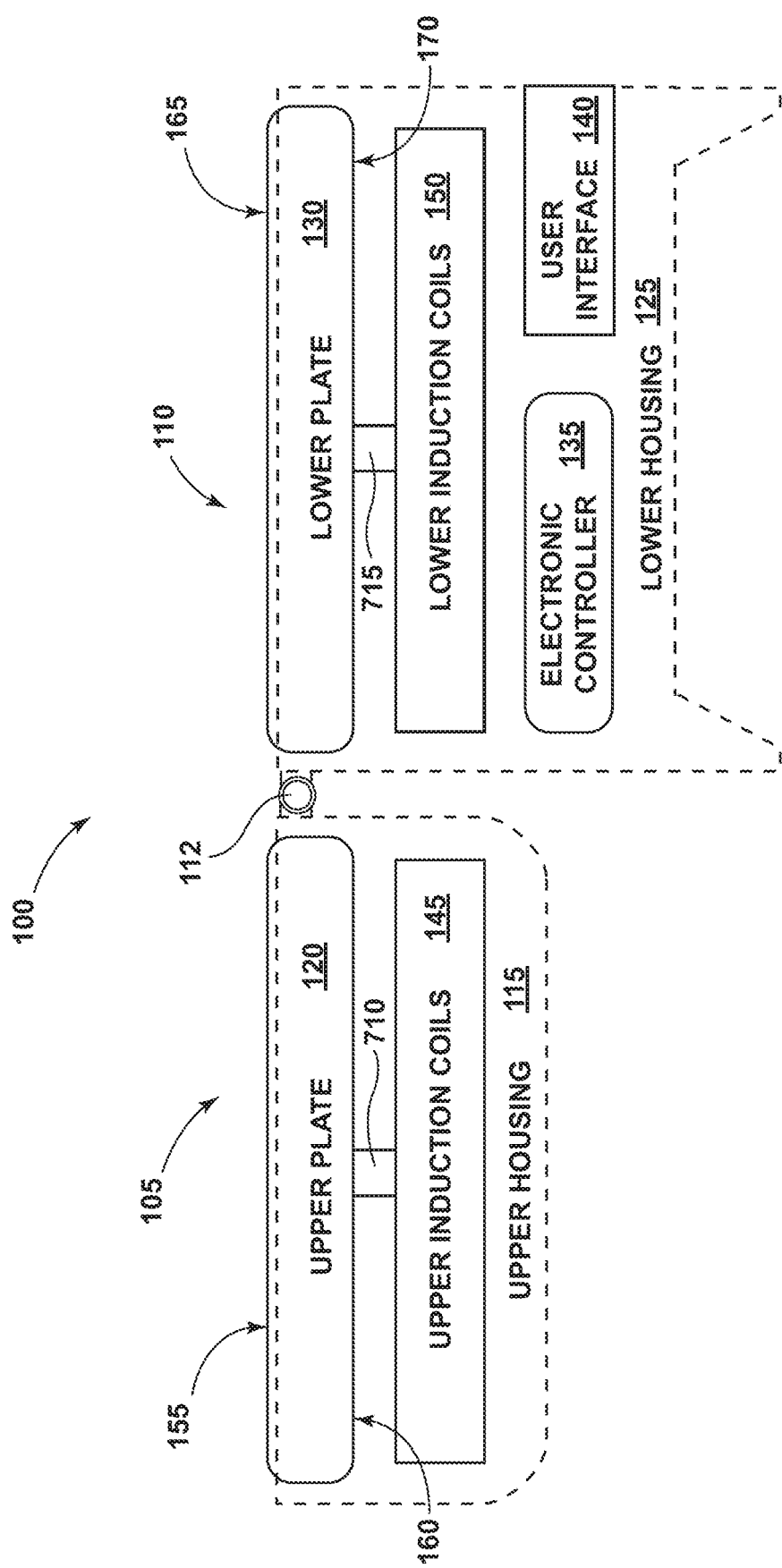
FIG. 8 is a schematic side view of an induction cooking system shown in an open position and according to another embodiment of the invention.
Figure 9:
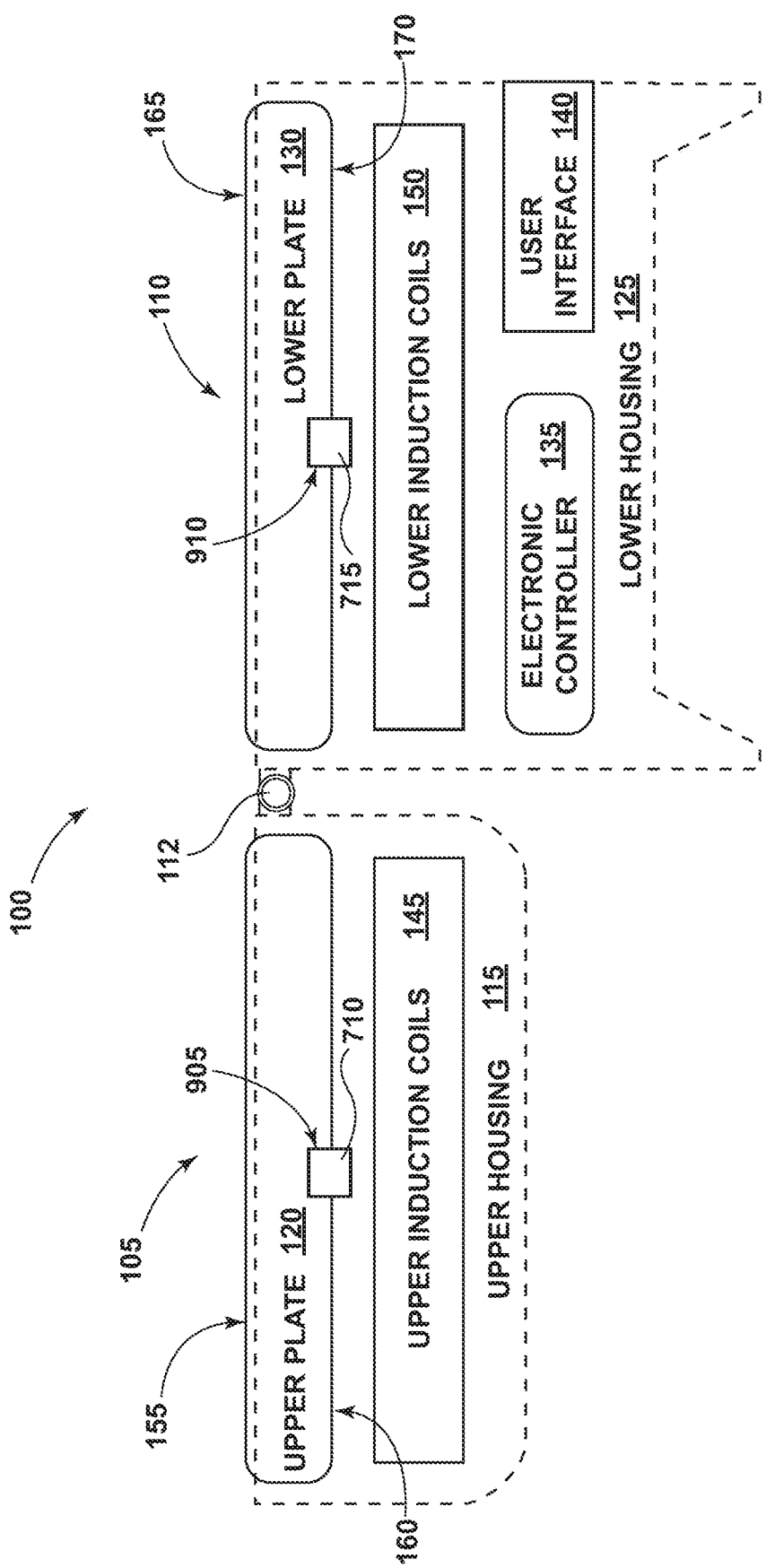
FIG. 9 is a schematic side view of an induction cooking system shown in an open position and according to yet another embodiment of the invention.

The upper temperature sensor 710 and the lower temperature sensor 715 sense an upper plate temperature and a lower plate temperature of the upper and lower plates 120, 130, respectively. In some embodiments, the upper and lower temperature sensors 710, 715 each include a plurality of temperature sensors. In some embodiments, the upper and lower temperature sensors 710, 715 are resistive temperature sensors. In other embodiments, the upper and lower temperature sensors 710, 715 are infrared temperature sensors. In other embodiments, the upper and lower temperature sensors 710, 715 are thermopiles, thermistors, or thermocouples. In other embodiments, the upper and lower temperature sensors 710, 715 are a combination of any of the above-mentioned temperature sensors. In some embodiments, as illustrated in FIG. 8, the upper temperature sensor 710 is coupled (for example, mounted) on the second side 160 of the upper plate 120 and the lower temperature sensor 715 is coupled on the second side 170 of the lower plate 130. In other embodiments, as illustrated in FIG. 9, holes 905, 910 are formed in the upper and lower plates 120, 130, and the upper and lower temperature sensors 710, 715 are embedded into the holes 905, 910.

In operation, the upper and lower induction coils 145, 150 produce oscillating magnetic fields operating at a particular frequency (for example, in a range of 20 kHz to 30 kHz). The oscillating magnetic fields induce currents in the upper and lower plates 120, 130. The oscillating magnetic fields heat the material of the upper and lower plates 120, 130 by generating small eddy currents within the material and by causing oscillation of magnetic dipoles within the material, where at least a portion of the heat produced is proportional to the level of induced currents and at least a portion is due to oscillation of magnetic dipoles within the material.

In operation, the oscillating magnetic field produced by adjacent induction coils overlap. In particular, adjacent oscillating magnetic fields from oppositely directed currents sum together. For example, portions of the oscillating magnetic field produced by the first induction coil 405 may sum with portions of the oscillating magnetic field produced by the second induction coil 410. The spacing of orientation of the upper and lower induction coils 145, 150, such as illustrated in the embodiment of FIG. 4, evens out the sum of overlapping oscillating magnetic fields so as to be substantially equal across the upper and lower plates 120, 130.

In order words, the spacing and orientation of the of the upper and lower induction coils 145, 150, such as illustrated in the embodiment of FIG. 4 cause even heating across the upper and lower plates 120, 130. In such embodiments, equal oscillating magnetic fields across the upper and lower plates 120, 130 significantly reduce/minimize areas of uneven heating (for example, "hot spots") and achieve very even heating across the upper and lower plates 120, 130.

The first side 155 of the upper plate 120 and the first side 165 of the lower plate 130, generally, are in contact with food during operation. In the embodiment illustrated in FIG. 4, the upper and lower induction coils 145, 150 each include four induction coils to cover the first sides 155, 165 of the upper and lower plates 120, 130. In other embodiments, the upper and lower induction coils 145, 150 may be differently shaped and more or fewer induction coils may be used in various patterns to cover the first sides 155, 165 of the upper and lower plates 120, 130, and oriented or positioned in such a way as to optimize even heating across the first sides 155, 165 of the upper and lower plates 120, 130.

In one example of operation, a user may input an operating temperature (or other input to indicate a desired power or temperature level such as high/medium/low or a relative numerical setting, for example, 1-10) using the user interface 140. The electronic controller 135 receives the user input from the user interface 140 and operates the upper and lower induction coils 145, 150 in order to heat the upper and lower plates 120, 130 at the user-set operating temperature or at a power or temperature indicated by a relative setting. In various embodiments, the user may input an operating power level instead of an operating temperature.

For operation (e.g., of a panini grill), the general goal is to operate at a pre-determined temperature. Thus, quickly arriving at operating temperature (e.g., start up time), recovering temperature quickly (e.g., recovery time), and achieving even heating are necessary. For comparison, resistive heating systems typically rely on thicker plates for faster recovery time and even heating, which results in slower start up times. The uniform magnetic field shaping of the upper and lower induction coils 145, 150 enables even heating without requiring thick plates, and the thin upper and lower plates 120, 130 afford faster start up time and recovery time.

In another example of operation, the electronic controller 135 may operate the upper and lower induction coils 145, 150 at a holding temperature, for example, a temperature intended to keep food warm but not provide cooking. In some embodiments, the electronic controller 135 may operate the upper and lower induction coils 145, 150 at the holding temperature when the induction cooking system 100 is in an open position. Additionally, in some embodiments, the electronic controller 135 may operate the upper and lower induction coils 145, 150 at the operating temperature once the induction cooking system 100 is placed in a closed position.

In some embodiments, the electronic controller 135 may operate the upper and lower induction coils 145, 150 according to power control profiles. In such embodiments, power control profiles are used to optimize temperature stability by incorporating information of the heat response characteristics of the upper and lower plates 120, 130. For example, rather than operating the upper and lower induction coils 145, 150 at full (or maximum) power until the upper and lower temperature sensors 710, 715 indicate that the upper and lower plates 120, 130 are at a set temperature, the electronic controller 135 progressively decreases the current supplied to the upper and lower induction coils 145, 150 as the set temperature is approached. Decreasing the power as the set temperature is approached allows uneven heating to spread laterally to achieve a more uniform temperature.

Figure 10:
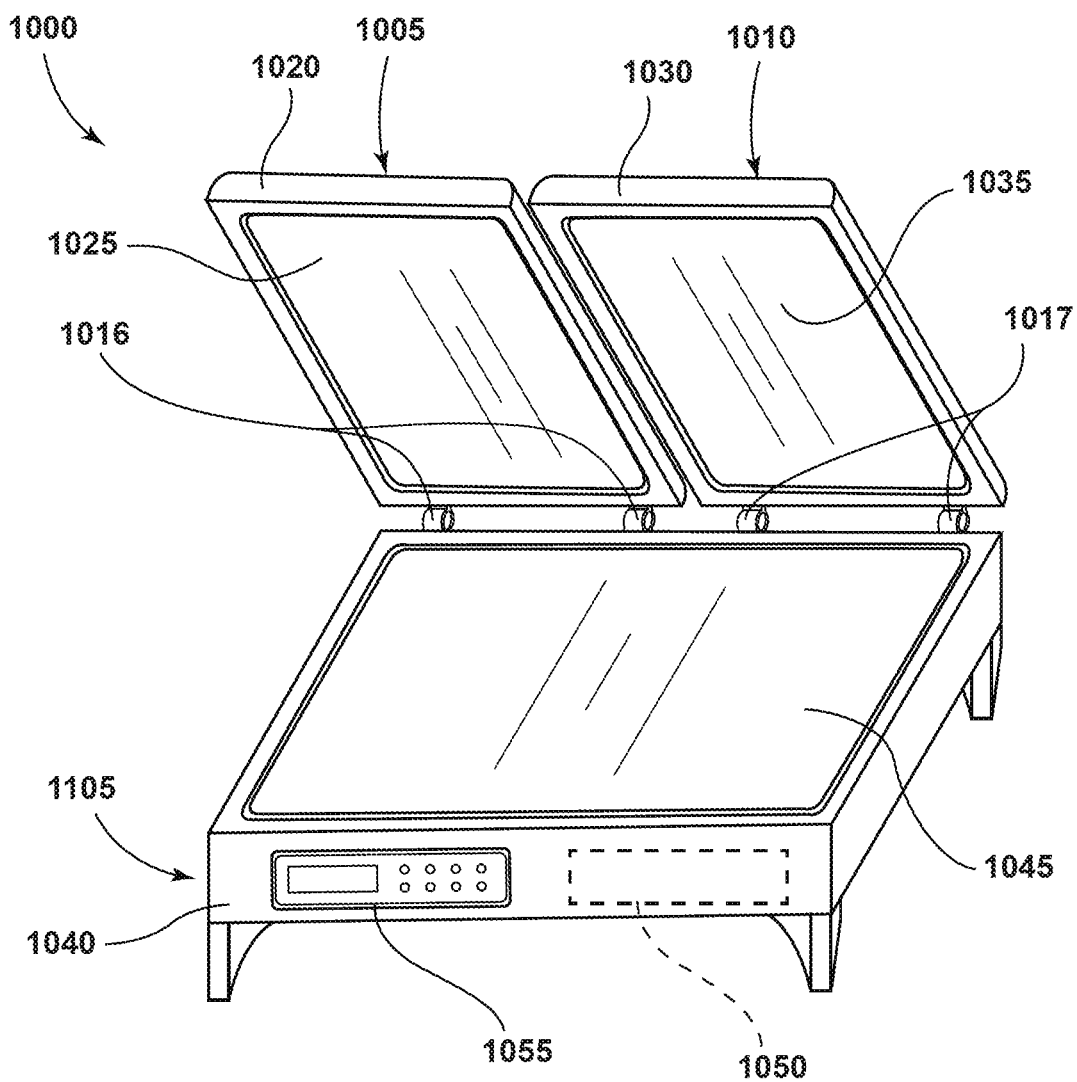
FIG. 10 is a perspective view of an induction cooking system shown in an open position and according to another embodiment of the invention.

In some embodiments, the upper shell 105 is split into a plurality of upper shells positioned adjacent to each other. FIG. 10 is a perspective view of another embodiment of an induction cooking system 1000 including a "split" upper shell (e.g., two upper shells), shown in an open position. The induction cooking system 1000 includes a left upper shell 1005, a right upper shell 1010, and a lower shell 1015. The right upper shell 1010 is positioned adjacent to the left upper shell 1005. The left and right upper shells 1005, 1010 are pivotably coupled to the lower shell 1015, and preferably pivotably coupled via one or more hinges 1016, 1017, respectively. The left and right upper shells 1005, 1010 pivot independently of each other. The left upper shell 1005 has a left upper housing 1020 and a left upper plate 1025. The right upper shell 1010 has a right upper housing 1030 and a right upper plate 1035. The lower shell 1015 has a lower housing 1040 and a lower plate 1045. The left upper, right upper, and lower plates 1025, 1035, 1045 may be releasably coupled to the induction cooking system 1000, for example, to facilitate cleaning and to permit replacement as needed. The induction cooking system 1000 also includes an electronic controller 1050. In some embodiments the induction cooking system 1000 may further include a user interface 1055.

Figure 11:
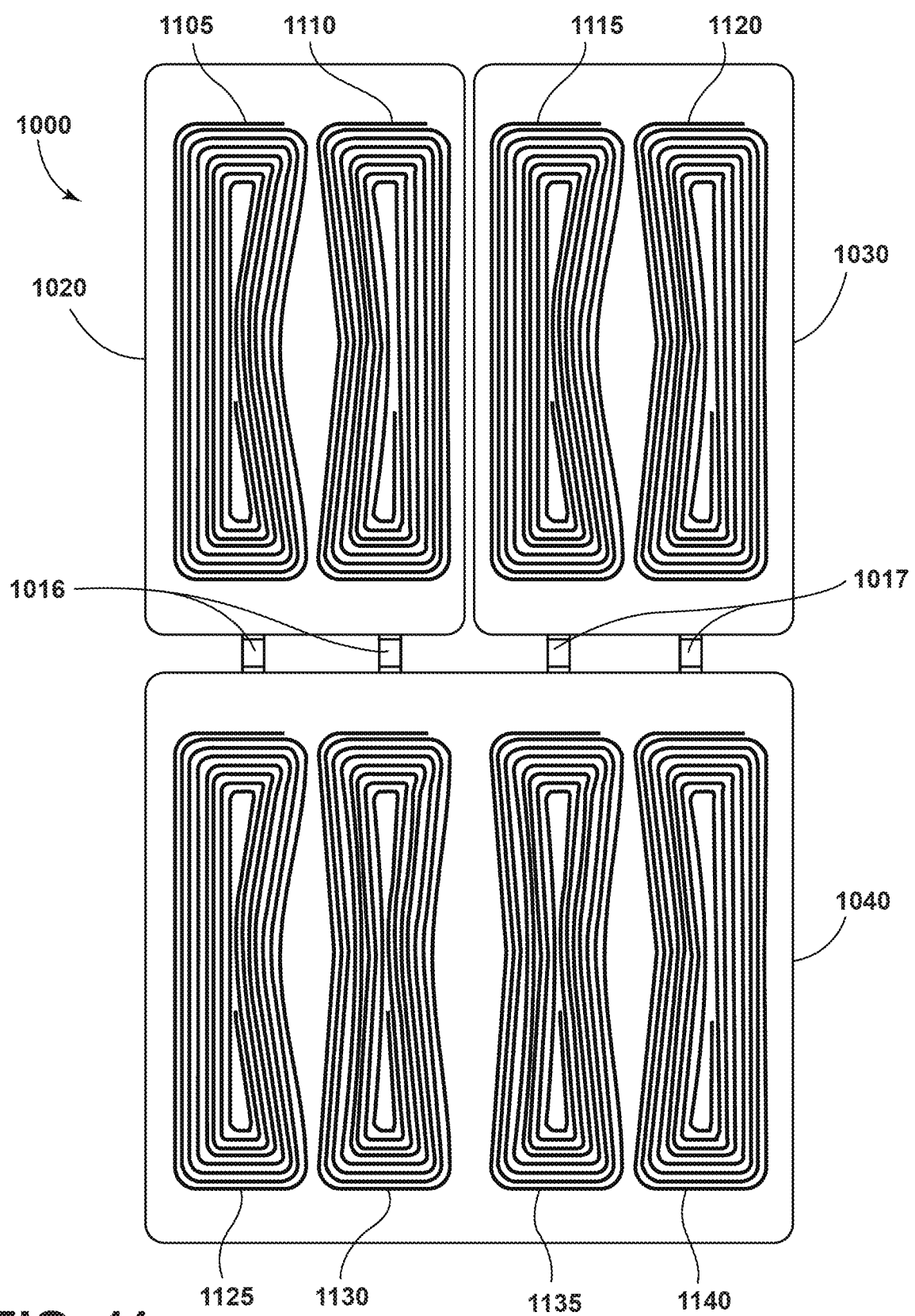
FIG. 11 is a top view of the induction cooking system of FIG. 10.

FIG. 11 is a top view of the induction cooking system 1000 shown in an open position. In the illustrated view, the left upper, right upper, and lower plates 1025, 1035, 1045 have been removed for illustrative purposes. The left upper housing 1020 may include two induction coils, such as a first induction coil 1105 and a second induction coil 1110. The right upper housing 1030 may include two inductions coils, such as a third induction coil 1115 and a fourth induction coil 1120. The lower housing 1040 may include four induction coils, such as a fifth induction coil 1125, a sixth induction coil 1130, a seventh induction coil 1135, and an eighth induction coil 1140. In some embodiments, the adjacent peripheral edges of the second induction coil 1110 in the left upper shell 1005 and the third induction coil 1115 in the right upper shell 1010 are shaped similar to, for example, the first peripheral edge 520 of the first induction coil 405 (e.g., substantially linear or straight). The distance relationships described with respect to the axes, edges, contours, and/or surfaces of the induction coils of FIGS. 5 and 6 are equally applicable to the induction coils of FIG. 11 and are not repeated herein.

Figure 12:
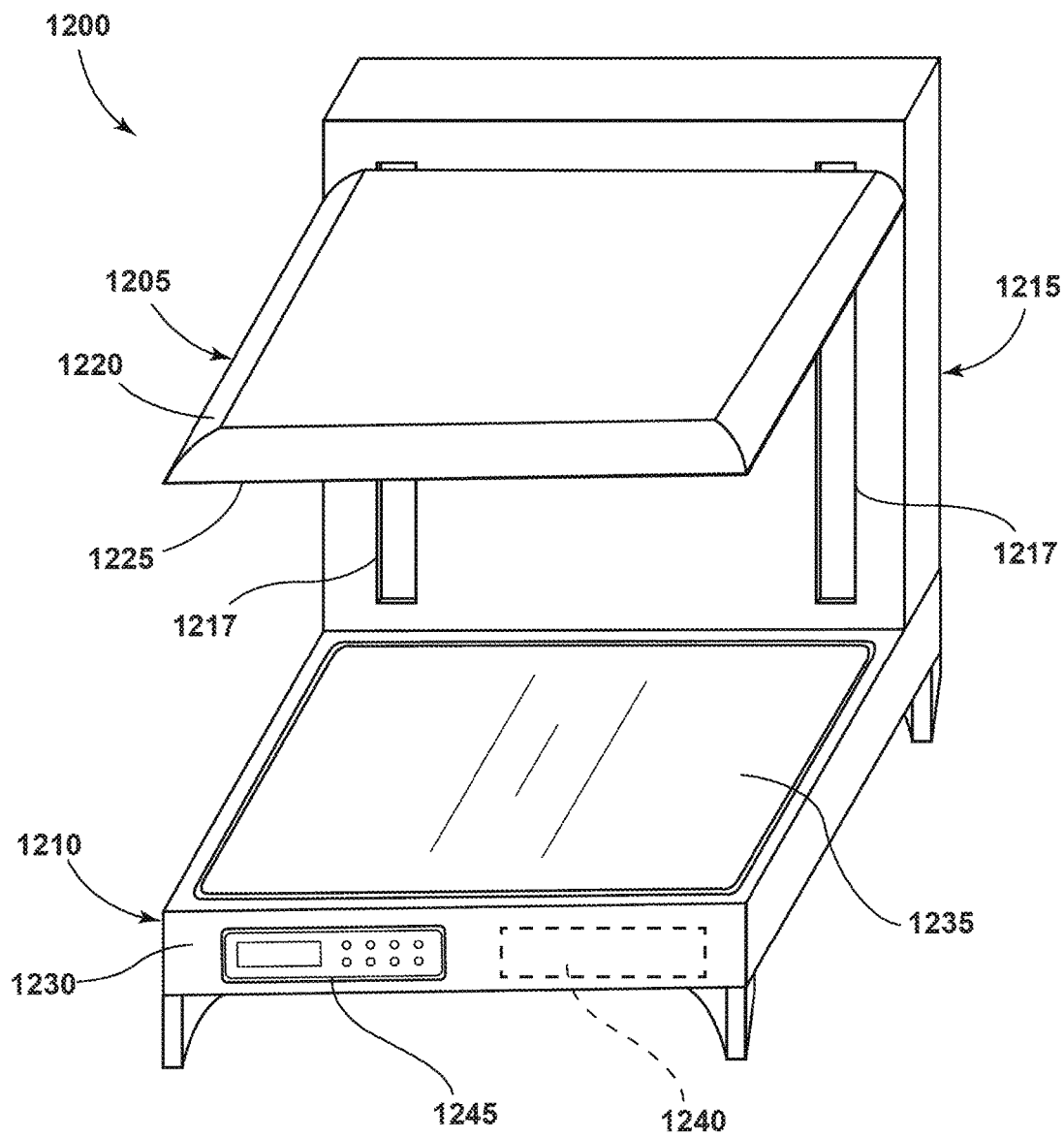
FIG. 12 is a perspective view of an induction cooking system shown in an open position and according to yet another embodiment of the invention.

In some embodiments, the upper shell 105 is coupled to the lower shell 110 such that the upper plate 120 may be displaced vertically (for example, raised and lowed) with respect to the lower plate 130. FIG. 12 is a perspective view of another embodiment of an induction cooking system 1200 including a vertically-displaceable (or translatable) upper shell, shown in an open position. The induction cooking system 1200 includes an upper shell 1205, a lower shell 1210, and a support structure 1215. In this embodiment, the upper shell 1205 moves vertically with respect to the lower shell 1210 along one or more tracks 1217 included in the support structure 1215. The upper shell 1205 has an upper housing 1220 and an upper plate 1225. The lower shell 1210 has a lower housing 1230 and a lower plate 1235. The upper shell 1205 is coupled to the lower shell 1210 via the support structure 1215 such that the upper plate 1225 may be displaced vertically (for example, raised and lowered) along tracks 1217 with respect to the lower plate 1235. The upper and lower plates 1225, 1235 may be releasably coupled to the induction cooking system 1200, for example, to facilitate cleaning and to permit replacement as needed. The induction cooking system 1200 also includes an electronic controller 1240. In some embodiments the induction cooking system 1200 may further include a user interface 1245.

In other embodiments, the upper shell 1205 may be coupled to the lower shell 1210 via other types of connectors and structures such that the upper plate 1225 may be displaced vertically with respect to the lower plate 1235 (for example, coupled via spaced-apart vertical columns or scissor links).

Thus, the induction cooking system, as described above, allows for greater heat distribution than resistive cooking systems or embedded heater cooking systems. Additionally, the induction cooking system, as described above, allows for substantially faster recovery times (for example, reheating the upper and lower plates after a cooking cycle). Various features and advantages of the disclosure are set forth in the following claims.

What is claimed is:

1. An induction cooking system comprising:
   a first shell including
      a first housing,
      a first plate coupled to the first housing,
      a first induction coil disposed within the first housing, the first induction coil having an axis extending along a length of the first induction coil from a first end of the first induction coil to a second end of the first induction coil opposite the first end, a portion of the first induction coil defining a peripheral edge extending from the first end of the first induction coil to the second end of the first induction coil, wherein the axis of the first induction coil is spaced a distance from the peripheral edge of the first induction coil and the distance between the axis of the first induction coil and the peripheral edge of the first induction coil varies along the length of the first induction coil from the first end of the first induction coil to a mid-point of the first induction coil and from the second end of the first induction coil to the mid-point of the first induction coil, and
      a second induction coil disposed within the first housing, the second induction coil having an axis extending along a length of the second induction coil from a first end of the second induction coil to a second end of the second induction coil opposite the first end, a portion of the second induction coil defining a peripheral edge extending from the first end of the second induction coil to the second end of the second induction coil, wherein the axis of the second induction coil is spaced a distance from the peripheral edge of the second induction coil and the distance between the axis of the second induction coil and the peripheral edge of the second induction coil varies along the length of the second induction coil from the first end of the second induction coil to a mid-point of the second induction coil and from the second end of the second induction coil to the mid-point of the second induction coil; and
   a second shell coupled to the first shell, the second shell including
      a second housing, and
      a second plate coupled to the second housing,
   wherein no induction coil is positioned between the peripheral edge of the first induction coil and the peripheral edge of the second induction coil, the peripheral edge of the first induction coil is spaced apart a distance, in a direction orthogonal to the axis of the first induction coil, from the peripheral edge of the second induction coil and the distance increases along the lengths of each of the first and the second induction coils from (i) the first end of each of the first and the second induction coils to the mid-point of each induction coil and (ii) the second end of each of the first and the second induction coils to the mid-point of each induction coil.

2. The induction cooking system of claim 1, wherein a third induction coil is disposed within the second housing, the third induction coil having an axis
  extending along a length from a first end of the third induction coil to a second end of the third induction coil opposite the first end, a portion of the third induction coil defining a peripheral edge extending from the first end of the third induction coil to the second end of the third induction coil, wherein the axis of the third induction coil is spaced a distance from the peripheral edge of the third induction coil and the distance between the axis of the third induction coil and the peripheral edge of the third induction coil varies along the length of the third induction coil from the first end of the third induction coil to a mid-point of the third induction coil and from the second end of the third induction coil to the mid-point of the third induction coil, and
  wherein a fourth induction coil is disposed within the second housing, the fourth induction coil having an axis extending along a length of the fourth induction coil from a first end of the fourth induction coil to a second end of the fourth induction coil opposite the first end, a portion of the fourth induction coil defining a peripheral edge extending from the first end of the fourth induction coil to the second end of the fourth induction coil, wherein the axis of the fourth induction coil is spaced a distance from the peripheral edge of the fourth induction coil and the distance between the axis of the fourth induction coil and the peripheral edge of the fourth induction coil varies along the length of the fourth induction coil from the first end of the fourth induction coil to the a mid-point of the fourth induction coil and from the second end of the fourth induction coil to the mid-point of the fourth induction coil.

3. The induction cooking system of claim 2, further comprising:
  a first temperature sensor sensing a first plate temperature;
  a second temperature sensor sensing a second plate temperature; and
  an electronic controller configured to
    receive the first plate temperature,
    receive the second plate temperature,
    adjust a first current supply to the first induction coil based on the first plate temperature, and
    adjust a second current supply to the third induction coil based on the second plate temperature.

4. The induction cooking system of claim 1, wherein the first shell is pivotably coupled to the second shell.

5. The induction cooking system of claim 1, wherein the first shell is coupled to the second shell such that the first plate is translatable with respect to the second plate.

6. The induction cooking system of claim 1, wherein the first plate and the second plate comprise aluminum plates having magnetic steel deposited thereon.

7. The induction cooking system of claim 1, wherein the layout of the first induction coil and the second induction coil generates substantially equal overlapping oscillating magnetic fields across the first plate.

8. The induction cooking system of claim 1, wherein the distance between the axis of the first induction coil and the peripheral edge of the first induction coil decreases along the length of the first induction coil from the first end of the first induction coil to the mid-point of the first induction coil and from the second end of the first induction coil to the mid-point of the first induction coil.

9. An induction cooking system comprising:
  a first shell including
    a first housing,
    a first plate coupled to the first housing,
    a first induction coil disposed within the first housing, the first induction coil having an axis extending along a length of the first induction coil from a first end of the first induction coil to a second end of the first induction coil opposite the first end, a portion of the first induction coil defining a peripheral edge extending from the first end of the first induction coil to the second end of the first induction coil, wherein the axis of the first induction coil is spaced a distance from the peripheral edge of the first induction coil and the distance between the axis of the first induction coil and the peripheral edge of the first induction coil decreases along the length of the first induction coil from the first end of the first induction coil to a mid-point of the first induction coil and from the second end of the first induction coil to the mid-point of the first induction coil, and
    a second induction coil disposed within the first housing, the second induction coil having an axis extending along a length of the second induction coil from a first end of the second induction coil to a second end of the second induction coil opposite the first end, a portion of the second induction coil defining a peripheral edge extending from the first end of the second induction coil to the second end of the second induction coil, wherein the axis of the second induction coil is spaced a distance from the peripheral edge of the second induction coil and the distance between the axis of the second induction coil and the peripheral edge of the second induction coil decreases along the length of the second induction coil from the first end of the second induction coil to a mid-point of the second induction coil and from the second end of the second induction coil to the mid-point of the second induction coil; and
  a second shell coupled to the first shell, the second shell including
    a second housing, and
    a second plate coupled to the second housing,
  wherein no induction coil is positioned between the peripheral edge of the first induction coil and the peripheral edge of the second induction coil, and
  wherein the peripheral edge of the first induction coil is spaced a distance from the peripheral edge of the second induction coil and the distance, in a direction orthogonal to the axis of the first induction coil, between the peripheral edge of the first induction coil and the peripheral edge of the second induction coil, increases in a direction that is parallel to the axis of the first induction coil and toward the mid-point of the first induction coil.

10. The induction cooking system of claim 9, wherein the first shell is coupled to the second shell such that the first plate is translatable with respect to the second plate.

11. The induction cooking system of claim 9, wherein the first plate and the second plate comprise aluminum plates having magnetic steel deposited thereon.

12. The induction cooking system of claim 9, wherein each of the first and second induction coils includes a parallel-resonant design.

13. The induction cooking system of claim 9, wherein each of the first and second induction coils includes a zero-voltage switched design.

14. The induction cooking system of claim 9, wherein each of the first and second induction coils includes a center-tapped design.

15. An induction cooking system comprising:
a first shell including
a first housing,
a first plate coupled to the first housing,
a first induction coil disposed within the first housing, the first induction coil having a first peripheral edge and a second peripheral edge both extending along a length of the first induction coil from a first end of the first induction coil to a second end of the first induction coil opposite the first end of the first induction coil, wherein the first peripheral edge of the first induction coil is spaced a distance from the second peripheral edge of the first induction coil and the distance between the first peripheral edge of the first induction coil and the second peripheral edge of the first induction coil varies along the length of the first induction coil from the first end of the first induction coil to a mid-point of the first induction coil and from the second end of the first induction coil to the mid-point of the first induction coil, and
a second induction coil disposed within the first housing, the second induction coil having a first peripheral edge and a second peripheral edge both extending along a length of the second induction coil from a first end of the second induction coil to a second end of the second induction coil opposite the first end of the second induction coil, wherein the first peripheral edge of the second induction coil is spaced a distance from the second peripheral edge of the second induction coil and the distance between the first peripheral edge of the second induction coil and the second peripheral edge of the second induction coil varies along the length of the second induction coil from the first end of the second induction coil to the a mid-point of the second induction coil and from the second end of the second induction coil to the mid-point of the second induction coil;
a third induction coil disposed within the first housing and positioned between the first peripheral edge of the first induction coil and the first peripheral edge of the second induction coil, wherein the third induction coil has a first peripheral edge and a second peripheral edge each extending along a length an axis of the third induction coil from a first end of the third induction coil to a second end of the third induction coil opposite the first end of the third induction coil, an axis of the third induction coil also extending along a length of the third induction coil from the first end to the second end,
wherein the first peripheral edge of the third induction coil is spaced a first distance from the first peripheral edge of the first induction coil and the first distance, in a direction orthogonal to the axis, between the peripheral edge of the third induction coil and the peripheral edge of the first induction coil, increases in a direction that is parallel to the axis and toward the mid-point of the third induction coil, and
wherein the second peripheral edge of the third induction coil is spaced a second distance from the first peripheral edge of the second induction coil and the second distance, in a direction orthogonal to the axis, between the peripheral edge of the third induction coil and the peripheral edge of the second induction coil, increases in a direction that is parallel to the axis and toward the mid-point of the third induction coil; and
a second shell coupled to the first shell, the second shell including
a second housing, and
a second plate coupled to the second housing.

16. The induction cooking system of claim 15, wherein a fourth induction coil is disposed within the second housing, the fourth induction coil having an axis extending along a length from a first end of the fourth induction coil to a second end of the fourth induction coil opposite the first end of the fourth induction coil and a first peripheral edge and a second peripheral edge each peripheral edge extending from the first end of the fourth induction coil to the second end of the fourth induction coil, wherein the first peripheral edge of the fourth induction coil is spaced a distance from the second peripheral edge of the fourth induction coil and the distance between the first peripheral edge and second peripheral edge of the fourth induction coil varies along the length of the fourth induction coil from the first end of the fourth induction coil to a mid-point of the fourth induction coil and from the second end of the fourth induction coil to the mid-point of the fourth induction coil, and
wherein a fifth induction coil is disposed within the second housing, the fifth induction coil having an axis extending along a length of the fifth induction coil from a first end of the fifth induction coil to a second end of the fifth induction coil opposite the first end of the fifth induction coil and a first peripheral edge and a second peripheral edge extending from the first end of the fifth induction coil to the second end of the fifth induction coil, wherein the first peripheral edge of the fifth induction coil is spaced a distance from the second peripheral edge of the fifth induction coil and the distance between the first peripheral edge and the second peripheral edge of the fifth induction coil varies along the length of the fifth induction coil from the first end of the fifth induction coil to a mid-point of the fifth induction coil and from the second end of the fifth induction coil to the mid-point of the fifth induction coil.

17. The induction cooking system of claim 15, wherein the first peripheral edge of the first induction coil and the first peripheral edge of the second induction coil are adjacent to one another and spaced apart a distance, and the distance between the first peripheral edge of the first induction coil and the first peripheral edge of the second induction coil varies along the lengths of the first and second induction coils from the first end of each of the first induction coil and the second induction coil to the mid-point of each induction coil and from the second end of each of the first and the second induction coils to the mid-point of each induction coil.

18. The induction cooking system of claim 17, wherein the distance between the first peripheral edge of the first induction coil and the first peripheral edge of the second induction coil increases along the lengths of the first and the second induction coils from the first end of each of the first induction coil and second induction coil to the mid-point of each induction coil and from the second end of each of the first and the second induction coils to the mid-point of each of the first and second induction coils.

19. The induction cooking system of claim 15, wherein the layout of the first induction coil and the second induction coil generates substantially equal overlapping oscillating magnetic fields across the first plate.

20. The induction cooking system of claim 15, wherein the distance between the first peripheral edge and the second peripheral edge of the first induction coil decreases along the length of the first induction coil from the first end of the first induction coil to the mid-point of the first induction coil and from the second end of the first induction coil to the mid-point of the first induction coil.

21. The induction cooking system of claim 9, wherein the first shell is pivotably coupled to the second shell.

22. The induction cooking system of claim 9, wherein the first induction coil further a second peripheral edge extending along a length of the first induction coil from the first end of the first induction coil to the second end of the first induction coil, wherein the first peripheral edge of the first induction coil is spaced a distance from the second peripheral edge of the first induction coil and the distance between the first peripheral edge of the first induction coil and the second peripheral edge of the first induction coil varies along the length of the first induction coil from the first end of the first induction coil to the mid-point of the first induction coil and from the second end of the first induction coil to the mid-point of the first induction coil.

23. The induction cooking system of claim 22, wherein the distance between the first peripheral edge of the first induction coil and the second peripheral edge of the first induction coil decreases along the length of the first induction coil from the first end of the first induction coil to the mid-point of the first induction coil and from the second end of the first induction coil to the mid-point of the first induction coil.

24. An induction cooking system comprising:
a first shell including
 a first housing,
 a first plate coupled to the first housing,
 a first induction coil disposed within the first housing, the first induction coil having an axis extending along a length of the first induction coil from a first end of the first induction coil to a second end of the first induction coil opposite the first end a first portion of the first induction coil defining a first peripheral edge extending from the first end of the first induction coil to the second end of the first induction coil and a second portion of the first induction coil defining a second peripheral edge spaced a distance from the first peripheral edge and extending from the first end of the first induction coil to the second end of the first induction coil, wherein the distance between the first peripheral edge of the first induction coil and the second peripheral of the first induction coil decreases along the length of the first induction coil from the first end of the first induction coil to a mid-point of the first induction coil and from the second end of the first induction coil to the mid-point of the first induction coil and
a second induction coil disposed within the first housing, the second induction coil having an axis extending along a length of the second induction coil from a first end of the second induction coil to a second end of the second induction coil opposite the first end, a first portion of the second induction coil defining a first peripheral edge extending from the first end of the second induction coil to the second end of the second induction coil and a second portion of the second induction coil defining a second peripheral edge spaced a distance from the first peripheral edge and extending from the first end of the second induction coil to the second end of the second induction coil, wherein the distance between the first peripheral edge of the first induction coil and the second peripheral of the second induction coil decreases along the length of the second induction coil from the first end of the second induction coil to a mid-point of the second induction coil and from the second end of the second induction coil to the mid-point of the second induction coil; and
a second shell coupled to the first shell the second shell including
 a second housing, and
 a second plate coupled to the second housing,
wherein no induction coil is positioned between the first peripheral edge of the first induction coil and the first peripheral edge of the second induction coil, and wherein the first peripheral edge of the first induction coil is spaced a distance from the first peripheral edge of the second induction coil and the distance, in a direction orthogonal to the axis of the first induction coil, between the first peripheral edge of the first induction coil and the first peripheral edge of the second induction coil, increases in a direction that is parallel to the axis of the first induction coil and toward the mid-point of the first induction coil.

* * * * *